US011242205B2

(12) United States Patent
Kotze

(10) Patent No.: US 11,242,205 B2
(45) Date of Patent: Feb. 8, 2022

(54) VERTICAL TENSIONING SYSTEM FOR A CONVEYOR BELT ARRANGEMENT

(71) Applicant: KCM ENGINEERS CC, Kuruman (ZA)

(72) Inventor: Gert Bleeker Kotze, Kuruman (ZA)

(73) Assignee: KCM Engineers CC, Kuruman (ZA)

( * ) Notice: Subject to any disclaimer, the term of this patent is extended or adjusted under 35 U.S.C. 154(b) by 0 days.

(21) Appl. No.: 16/492,061

(22) PCT Filed: Mar. 8, 2018

(86) PCT No.: PCT/IB2018/051501
§ 371 (c)(1),
(2) Date: Sep. 6, 2019

(87) PCT Pub. No.: WO2018/167613
PCT Pub. Date: Sep. 20, 2018

(65) Prior Publication Data
US 2021/0139247 A1 May 13, 2021

(30) Foreign Application Priority Data
Mar. 13, 2017 (ZA) .................. 2017/01801

(51) Int. Cl.
*B65G 23/44* (2006.01)
*B65G 23/10* (2006.01)
*B65G 23/22* (2006.01)

(52) U.S. Cl.
CPC ............. *B65G 23/44* (2013.01); *B65G 23/10* (2013.01); *B65G 23/22* (2013.01); *B65G 2812/02138* (2013.01)

(58) Field of Classification Search
CPC ........ B65G 23/10; B65G 23/22; B65G 23/44; B65G 15/00; B65G 15/28; B65G 15/30; B65G 17/00; B65G 2812/02138
(Continued)

(56) References Cited

U.S. PATENT DOCUMENTS 2,270,000 A   1/1942 Danker
2,763,361 A * 9/1956 Foster .................. B65G 17/02
                                              198/814
(Continued)

FOREIGN PATENT DOCUMENTS

DE   102008006892 B4   1/2012
GB      2023526 A      1/1980

OTHER PUBLICATIONS

International Application No. PCT/IB2018/051501, International Search Report and Written Opinion, dated Jun. 20, 2018.
(Continued)

*Primary Examiner* — James R Bidwell
(74) *Attorney, Agent, or Firm* — Marshall, Gerstein & Borun LLP

(57) ABSTRACT

A tensioning system for a conveyor belt arrangement is provided. More particularly, but not exclusively, to a vertical belt tensioning system for an endless conveyor belt arrangement. The conveyor belt arrangement includes a drive pulley which is in use driven by an external drive, an idler pulley and an endless conveyor belt rotatably mounted about the pulleys. The conveyor belt arrangement also includes a belt tensioning arrangement for use in tensioning the endless conveyor belt, the tensioning arrangement including a displaceable take-up pulley, and an actuator for displacing the displaceable take-up pulley. The tensioning arrangement is characterized in that the displaceable take-up pulley is displaceable along a vertical axis.

7 Claims, 3 Drawing Sheets

(58) Field of Classification Search
USPC .......................................... 198/813, 814, 815
See application file for complete search history.

(56) References Cited

U.S. PATENT DOCUMENTS

| | | | | |
|---|---|---|---|---|
| 3,638,781 | A * | 2/1972 | Comley | B65G 23/44 |
| | | | | 198/810.04 |
| 3,753,488 | A * | 8/1973 | Wilson | B65G 23/44 |
| | | | | 198/815 |
| 3,910,405 | A * | 10/1975 | Couperus | B65G 15/16 |
| | | | | 198/626.4 |
| 4,378,875 | A * | 4/1983 | Allan | B65G 17/02 |
| | | | | 198/815 |
| 6,394,261 | B1 * | 5/2002 | DeGennaro | B65G 21/18 |
| | | | | 198/778 |
| 7,025,196 | B2 * | 4/2006 | Pfarr | B23K 26/0838 |
| | | | | 198/813 |
| 2004/0018808 | A1 | 1/2004 | Lin et al. | |
| 2004/0173436 | A1 | 9/2004 | Baker | |
| 2005/0077152 | A1 | 4/2005 | Pfarr et al. | |

OTHER PUBLICATIONS

International Application No. PCT/IB2018/051501, International Preliminary Report on Patentability, dated Aug. 2, 2019.

* cited by examiner

VERTICAL TENSIONING SYSTEM FOR A CONVEYOR BELT ARRANGEMENT

BACKGROUND TO THE INVENTION

THIS invention relates to a tensioning system for a conveyor belt arrangement and more particularly, but not exclusively, to a vertical belt tensioning system for an endless conveyor belt arrangement.

For the purposes of the interpretation of this specification the term "conveyor belt" shall be understood to include endless conveyor belt arrangements rotating about a plurality of rollers and/or idlers, irrespective of the specific configuration of the conveyor belt.

Conveyor belts are frequently used in many applications where materials need to be conveyed from one point to another. One common application of conveyor belts is in the mining industry where particulate ore is conveyed. A conveyor belt arrangement in essence constitutes an endless, flexible conveyor belt arranged about a plurality of rollers or idlers, thus enabling the entire flexible conveyor belt to be longitudinally displaced upon transmission thereof along the rotating rollers or idlers. The conveyor belt arrangement includes a carrying section or load support side on which the ore is transported, and a return section where the conveyor belt is empty.

Due to the occurrence of belt stretch, the start-up characteristics of a conveyor belt arrangement, and to prevent belt slippage around the drive pulley, a tension mechanism is required to ensure that the conveyor belt remains tensioned to a predetermined tension. Preferably, a constant belt tension is required and an adjustable, dynamic tensioning system is therefore most suited for use with long conveyor belts.

One of the most common tensioning systems (often referred to as belt take-up systems) is the well-known vertical gravity tensioner, which essentially consists of a tensioning idler located operatively below the conveyor belt structure, with the conveyor belt forming a vertical tensioning loop around the tensioning idler. The idler is biased downwardly by way of a gravitational bias induced by a weight, thus resulting in the tensioning idler constantly exerting a tensioning force on the conveyer belt.

Recent safety requirements dictate that all stored energy in a belt shall be isolated before any work is carried out on the belt. Isolation of a conventional vertical gravity tensioner is, however, complicated and dangerous due to the energy stored in the belt itself. It is difficult to disengage the tensioning weight from the belt, as the weight has to be removed using suitable rigging equipment.

Another type of take up system is a horizontal take-up system that included a horizontally displaceable take-up pulley. These systems are easier to isolate, but they require a large footprint to allow for movement and the counterweight system, which is not ideal.

It is accordingly an object of the invention to provide a tensioning system for a conveyor belt arrangement that will, at least partially, alleviate the above disadvantages.

It is also an object of the invention to provide a tensioning system for a conveyor belt arrangement which will be a useful alternative to existing tensioning systems

SUMMARY OF THE INVENTION

According to the invention there is provided a conveyor belt arrangement including:
 a drive pulley which is in use driven by an external drive;
 an idler pulley;
 an endless conveyor belt rotatably mounted about the pulleys; and
 a belt tensioning arrangement for use in tensioning the endless conveyor belt, the tensioning arrangement including
  a displaceable take-up pulley; and
  an actuating means for displacing the displaceable take-up pulley;
 characterized in that the displaceable take-up pulley is displaceable along a vertical axis.

There is provided for the actuating means to be in the form of a winch, a cable of which engages the displaceable take-up pulley.

There is also provided for the actuating means to be in the form of a piston and cylinder arrangement.

There is also provided for the conveyor belt arrangement to include a biasing means, in addition to the actuating means, that exerts a tensioning force on the displaceable take-up pulley.

The biasing means may be in the form of a weight or a spring.

There is provided for the biasing means to be secured to an end of the cable of the winch.

A section of the cable between the winch and the biasing means may engage the displaceable take-up pulley.

There is further provided for the conveyor belt arrangement to include at least two bend pulleys, with the displaceable take-up pulley located between the bend-pulleys when viewed in plan in order to minimize the footprint of the tensioning arrangement of the conveyor belt arrangement.

According to a further aspect of the invention there is provided a belt tensioning arrangement for use in tensioning an endless conveyor belt, the tensioning arrangement including
 a displaceable take-up pulley; and
 an actuating means for displacing the displaceable take-up pulley;
 characterized in that the displaceable take-up pulley is displaceable along a vertical axis.

BRIEF DESCRIPTION OF THE DRAWINGS

A preferred embodiment of the invention is described by way of a non-limiting example, and with reference to the accompanying drawings in which.

DETAILED DESCRIPTION OF INVENTION

Figure 1:
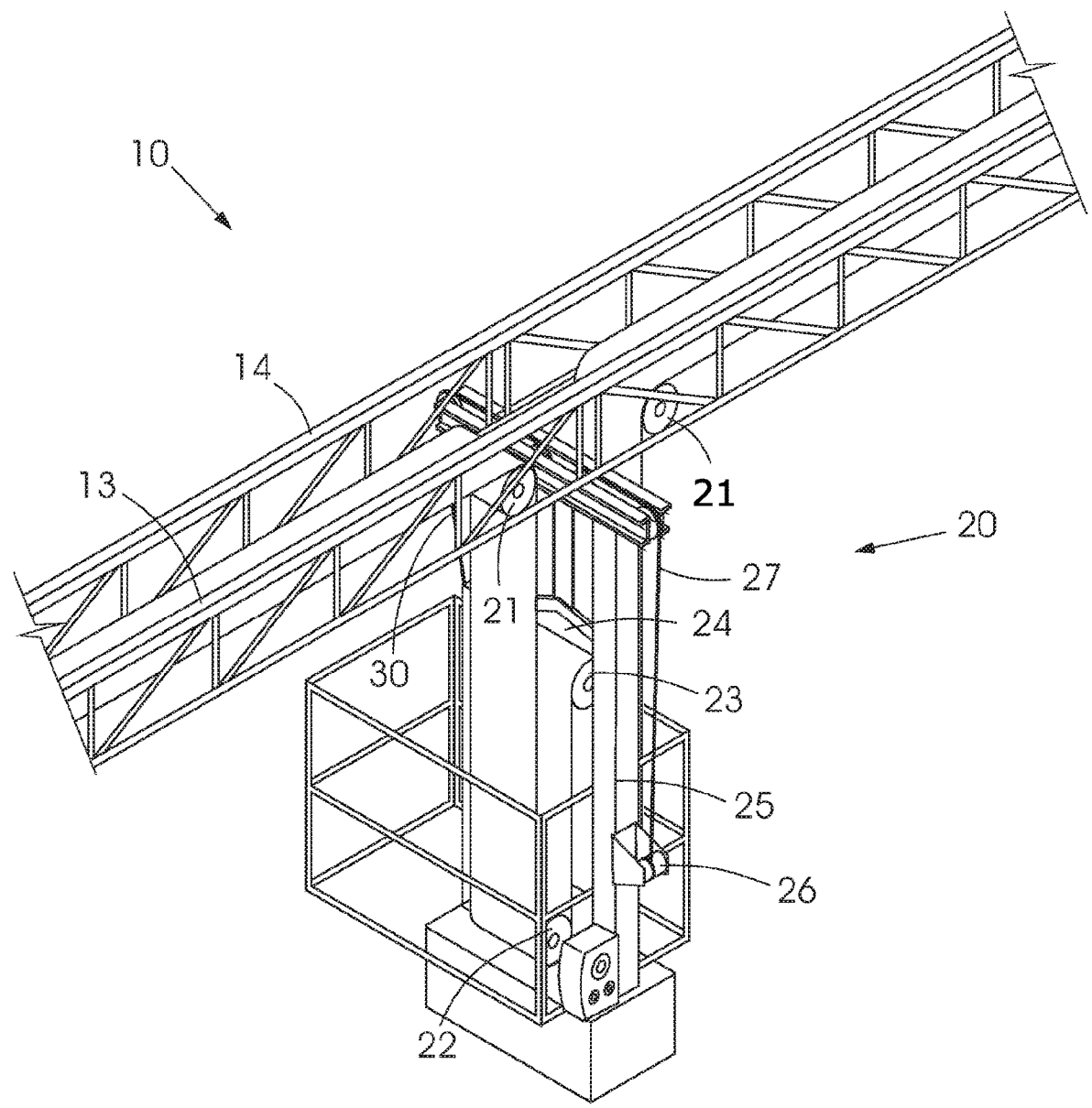
FIG. 1 is a perspective view of part of a conveyor belt system incorporating a belt tensioning arrangement in accordance with the invention.
Figure 2:
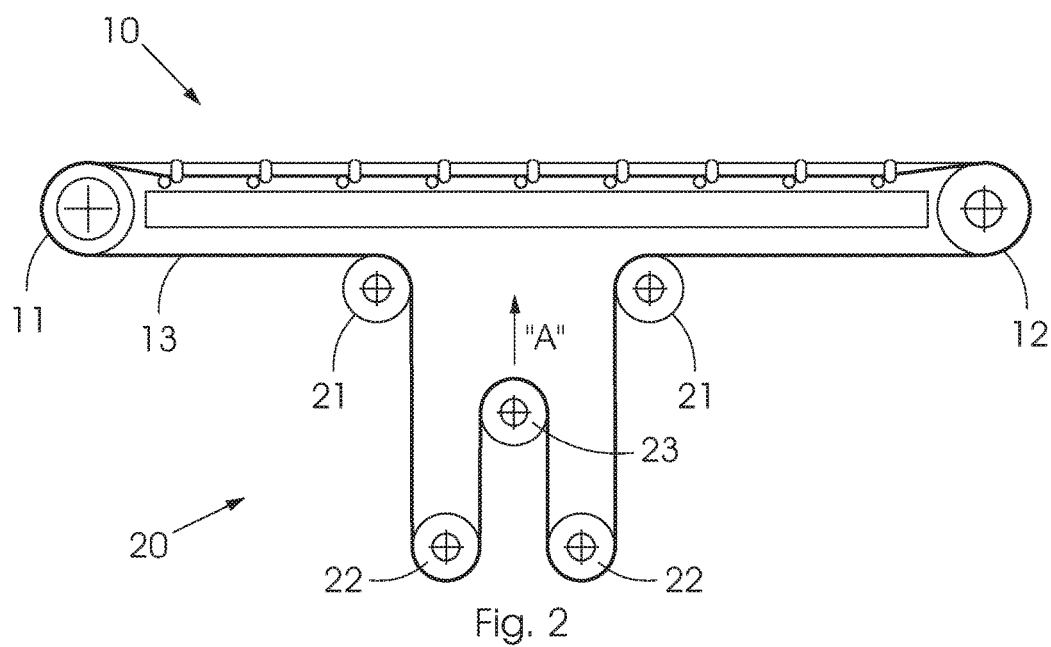
FIG. 2 is a schematic side view of the conveyor belt arrangement of FIG. 1.
Figure 3:
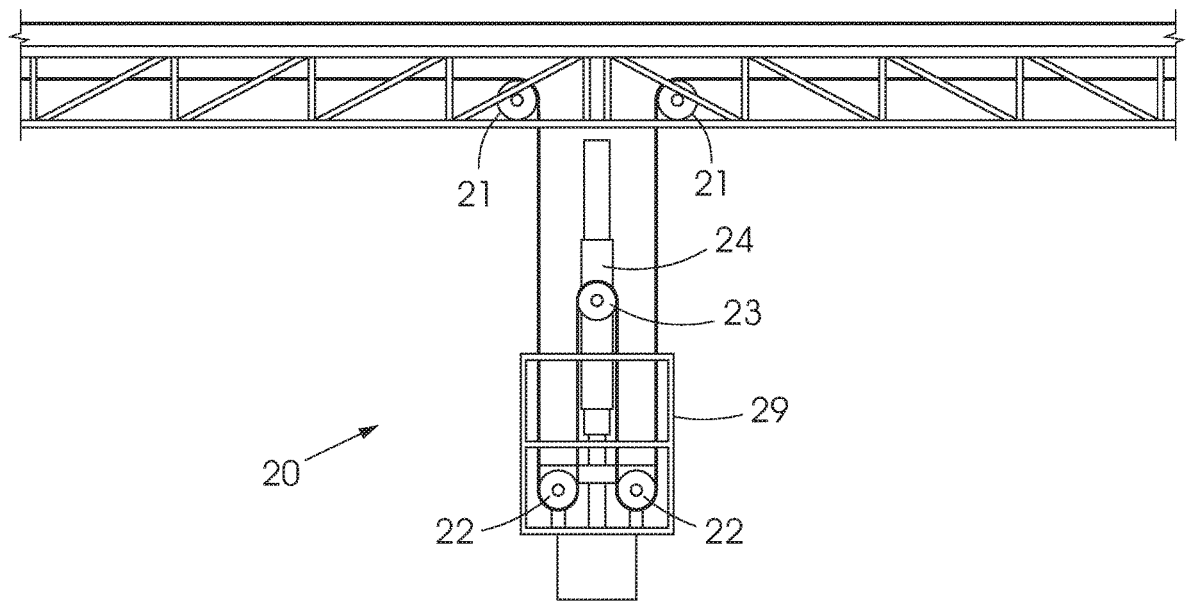
FIG. 3 is a side view of the conveyor belt arrangement of FIG. 1.
Figure 4:
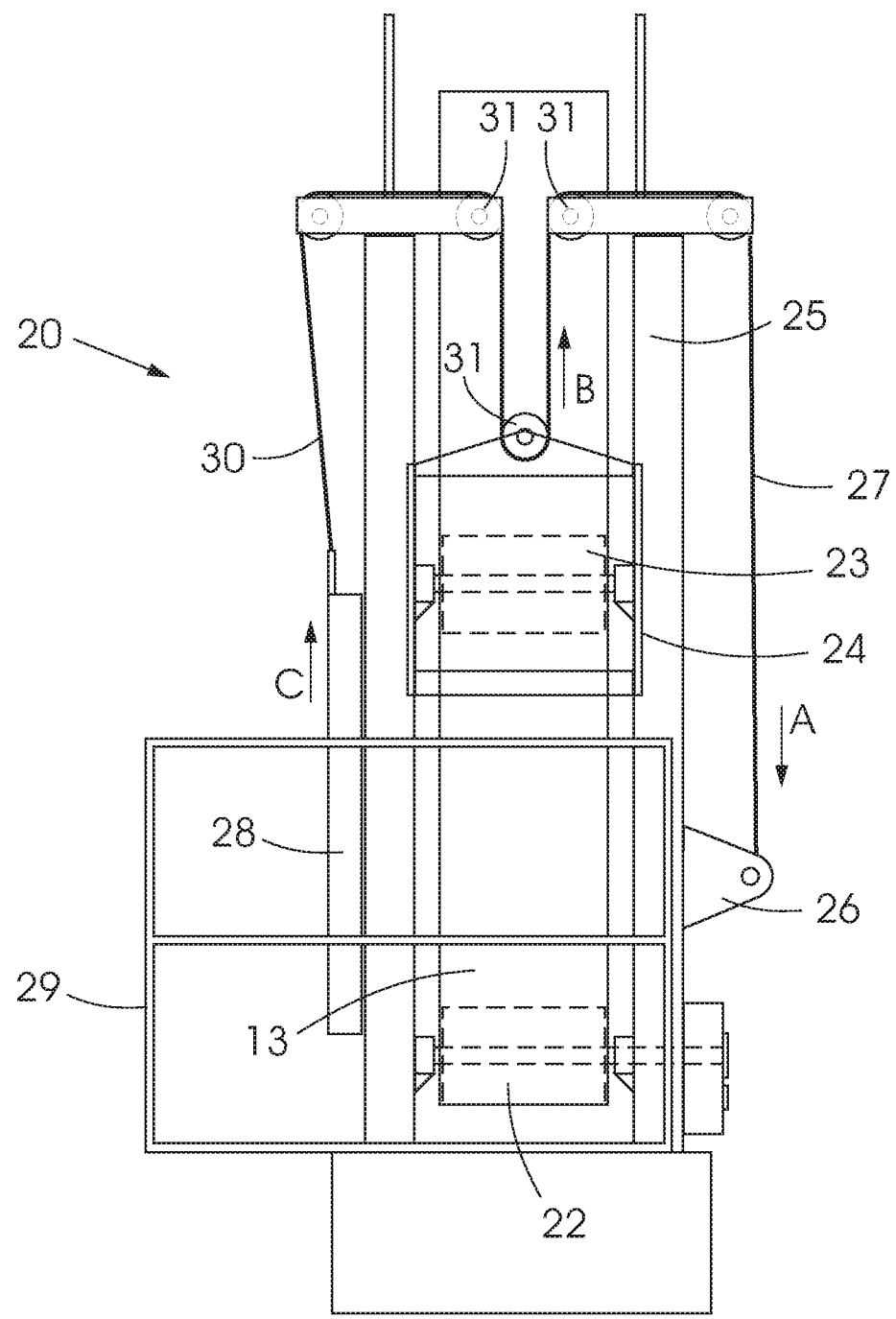
FIG. 4 is a cross-sectional view of the belt tensioning arrangement of the conveyor belt arrangement of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings and are thus intended to include direct connections between two members without any other members interposed therebetween and indirect connections between members in which one or more other members are interposed therebetween. Further, "connected" and "coupled" are not restricted to physical or mechanical connections or couplings. Additionally, the words "lower", "upper", "upward", "down" and "downward" designate directions in the drawings to which reference is made. The terminology includes the words specifically mentioned above, derivatives thereof, and words or similar import. It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Referring to the drawings, in which like numerals indicate like features, a non-limiting example of a conveyor belt arrangement in accordance with the invention is generally indicated by reference numeral 10.

The conveyor belt arrangement 10 comprises a support structure 14 that supports a drive pulley 11 at one end, and a tail pulley 12 at an opposite end, with an endless conveyor belt 13 extending between the drive pulley 11 and the tail pulley 12. Although this is the typical arrangement commonly found in the art, the inventor also foresees for the existing drive pulley 11 to be in the form of a free running idler similar to the existing tail pulley 12, with the actual drive pulley then being incorporated into the belt tensioning arrangement 20 as discussed in more detail below. The configuration of the drive pulley 11 is therefore not a salient aspect of this invention, as the gist of the invention resides in the specific configuration of the belt tensioning arrangement 20.

The belt tensioning arrangement 20 is used to adjust the tension in the conveyor belt 13 as discussed in more detail hereinbefore. In the embodiment illustrated in the drawings the belt tensioning arrangement 20 (also referred to as the belt take-up mechanism) comprises two upper bend pulleys 21 that direct the endless conveyor belt 13 into the belt tensioning arrangement 20. The upper bend pulleys 21 direct the endless conveyor belt 13 from a horizontal configuration to a vertical configuration. Two lower bend pulleys 22 are provided towards a lower end of the belt tensioning arrangement 20, and direct the conveyor belt towards a single displaceable take-up pulley 23 located operatively above the lower bend pulleys 22. In this example, the displaceable take-up pulley 23 is located halfway between the upper bend pulleys 21 and the lower bend pulleys 22.

Both the upper bend pulleys 21 and the lower bend pulleys 22 are rotatable, but the axes of rotation are fixed relative to a take-up support structure 25 of the belt tensioning arrangement 20. The displaceable take-up pulley 23 is also rotatable, but in this instance the axis of rotation is displaceable relative to the take-up support structure 25. In other words, the displaceable take-up pulley 23 is vertically displaceable relative to the take-up support structure 25. This is achieved by mounting the take-up pulley 23 on a sliding carriage 24 which slidingly connected to the take-up support structure 25.

The sliding carriage 24 can be upwardly displaced in order to displace the take-up pulley 23, thus increasing the effective length of the route that the endless conveyor belt 13 has to travel, and therefore also increasing the tension in the endless conveyor belt 13 if displaced upwardly. In the embodiment shown in the drawings, a winch 26 is secured to the take-up support structure 25, with a cable 27 of the winch 26 being connected to the sliding carriage 24. When the winch 26 is actuated to rotate in a first direction the cable 27 will pull the sliding carriage 24 upwardly in order to tension the conveyor belt 13. Conversely, when the winch 26 is actuated to rotate in a second, opposite direction the cable 27 will allow the sliding carriage to be displaced downwardly so as to reduce the tension in the conveyor belt 13.

A sliding counter weight 28 is provided on the opposite side of the sliding carriage 24 with a cable 30 extending between the sliding counter weight 28 and the sliding carriage 24. Although the cable is indicated by way of two reference numerals (27 and 30), in practice they form one single continuous cable that engage a plurality of pulleys 31 and extends between the winch 26 and the sliding weight 28. The pulleys 31 direct the cable towards a displaceable pulley 23 which is secured to the sliding carriage 24. The effect of this is that the rotation of the winch 26 in a first direction (resulting in the cable being displaced in the direction of arrow A, and the displaceable pulley 23 being displaced in the direction of arrow B) will eventually result in the sliding counter weight 28 to be displaced upwardly in the direction of arrow C. The sliding weight 28 is selected so as to provide a predetermined tension in the belt 13. By rotating the winch 26 in the opposite direction, the counterweight 28 and sliding carriage 24 will be lowered to ground level, resulting in zero energy stored in the conveyor belt 13 and therefore in safe maintenance conditions.

It should be noted that the counterweight and the winch can be replaced with a hydraulic cylinder, which will make it possible to vary the predetermined tension in the belt, for example when required for different operational conditions. The counterweights can also be replaced with tension springs, which will fulfil the same function of the counterweight in tensioning the belt to a predetermined tension.

The salient aspect of this invention is that the displaceable take-up pulley 23 is displaced in a vertical direction, and is located, in plan, between the two upper bend pulleys 21 so as to reduce the footprint of the belt tensioning arrangement 20. This renders the take-up mechanism safe, whilst still facilitating ease of maintenance and maintaining a small footprint.

It will be appreciated that the above is only one embodiment of the invention and that there may be many variations without departing from the spirit and/or the scope of the invention. It is easily understood from the present application that the particular features of the present invention, as generally described and illustrated in the figures, can be arranged and designed according to a wide variety of different configurations. In this way, the description of the present invention and the related figures are not provided to limit the scope of the invention but simply represent selected embodiments.

The skilled person will understand that the technical characteristics of a given embodiment can in fact be combined with characteristics of another embodiment, unless otherwise expressed or it is evident that these characteristics are incompatible. Also, the technical characteristics described in a given embodiment can be isolated from the other characteristics of this embodiment unless otherwise expressed.

The invention claimed is:

1. A conveyor belt arrangement including:
   a drive pulley which is in use driven by an external drive;
   an idler pulley;
   an endless conveyor belt rotatably mounted about the pulleys; and
   a belt tensioning arrangement for use in tensioning the endless conveyor belt, the tensioning arrangement including
   a displaceable conveyor belt take-up pulley;
   characterized in that the displaceable conveyor belt take-up pulley is upwardly displaceable along a substantially vertical axis in order to tension the conveyor belt, and downwardly displaceable along a substantially vertical axis in order to reduce the tension in the conveyor belt.

2. The conveyor belt arrangement of claim 1, further including an actuator adapted to displace the disposable conveyor belt take-up pulley and to exert a tensioning force on the displaceable take-up pulley.

3. The conveyor belt arrangement of claim 2, further including a biasing mechanism adapted to, in use, exert a further tensioning force on the displaceable conveyor belt take-up pulley.

4. The conveyor belt arrangement of claim 1 including at least two bend pulleys, with the conveyor belt take-up pulley located between the bend-pulleys when viewed in plan in order to minimize the footprint of the tensioning arrangement of the conveyor belt arrangement.

5. A conveyor belt tensioning arrangement for use in tensioning an endless conveyor belt, the tensioning arrangement including
   a displaceable conveyor belt take-up pulley;
   characterized in that the displaceable conveyor belt take-up pulley is upwardly displaceable along a substantially vertical axis in order to tension the conveyor belt, and downwardly displaceable along a substantially vertical axis in order to reduce the tension in the conveyor belt.

6. The conveyor belt tensioning arrangement of claim 5, further including an actuator for displacing the displaceable take-up pulley and exerting a tensioning force on the displaceable take-up pulley.

7. The conveyor belt tensioning arrangement of claim 6, further including a biasing mechanism adapted to, in use, exert a further tensioning force on the displaceable take-up pulley.

* * * * *